Patented Jan. 5, 1926.

1,568,627

UNITED STATES PATENT OFFICE.

PAUL SCHETELIG, OF BASEL, SWITZERLAND, ASSIGNOR TO THE FIRM SOCIETY OF CHEMICAL INDUSTRY IN BASLE, OF BASEL, SWITZERLAND.

CONDENSATION PRODUCT OF THE ANTHRAQUINONE SERIES AND PROCESS OF MAKING SAME.

No Drawing.   Application filed May 4, 1925.   Serial No. 28,021.

*To all whom it may concern:*

Be it known that I, PAUL SCHETELIG, a citizen of Switzerland, residing at Basel, Switzerland, have invented new and useful Condensation Products of the Anthraquinone Series and Processes of Making Same, of which the following is a full, clear, and exact specification.

The present invention relates to new dyestuffs, valuable for the production of fast tints on the fibre. It comprises the new products, the process of making same, and the material dyed with the new dyestuffs.

In specification No. 1,437,783 there is described a process consisting in treating amino-compounds of the anthraquinone series, the amino group of which may also be mono-substituted, with derivatives of 1.3.5-triazine halogenated in the nucleus, as for instance cyanuric chloride. There are thus obtained valuable condensation products containing 1.3.5-triazine nuclei which may be used partly as colouring matters, partly as starting materials for the production of dyestuffs.

As a result of further study and experiment on the lines of the above cited fundamental process, I have found that valuable new products are obtained by causing nucleal halogen derivatives of the 1.3.5-triazine to react on compounds of the general formula:

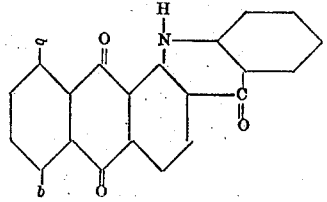

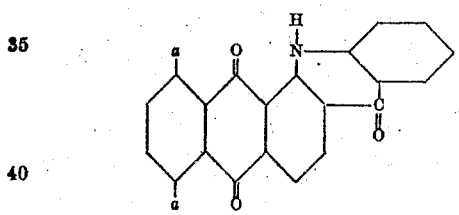

wherein one of the letters $a$ stands for an amino group and the other for a hydrogen atom and, in some cases, condensing the products thus obtained, which may still contain mobile halogen atoms, with suitable substances, as for example, amino compounds.

There are thus obtained dyestuffs of the general formula

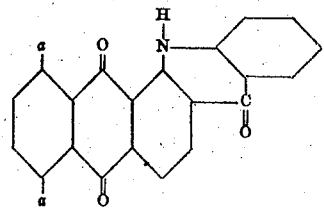

wherein one of the two letters $b$ stands for a radical

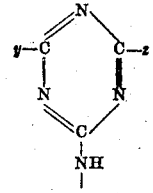

$y$ and $z$ being substituents of which one at least is an amino radical which may be substituted, and wherein the other letter $b$ stands for a hydrogen atom.

The new condensation products are dark powders, soluble in concentrated sulfuric acid to a red-orange and in alkaline hydrosulfite solution to a violet-brown solution, dyeing cotton tints which vary from red-violet to bordeaux and grey of excellent properties of fastness.

The 5- and the 8-amino-2.1-anthraquinone acridones of the general formula:

wherein one of the letters $a$ stands for an amino group and the other for a hydrogen atom, employed as intermediate products for the manufacture of the dyestuffs of the present invention are obtainable by the action of 5- or 8-amino-1-chloro-anthraquinone on anthranilic acid and subsequent condensation of the 1-anthraquinone anthranilic acid thus obtained with aid of a suitable condensing agent such as sulfuric acid or chlorosulfonic acid. The 5- or 8-amino-2.1-anthraquinone acridones form red to violet needles, soluble in concentrated sulfuric acid to an orange to yellow-orange solution and yielding a violet vat with hydrosulfite and caustic soda solution. The 8-amino-4'-chloro-2.1-anthraquinone acridone obtained in similar manner from 1-amino-5-chloro-2-benzoic acid shows analogous properties.

The following examples illustrate the invention, the parts being by weight:

Example 1.

34 parts of 8-amino-2.1-anthraquinone-acridone are introduced into 800 parts of nitrobenzene and 9.3 parts of cyanuric chloride are added. The mixture is heated gradually, while stirring, to 190–200° C. and stirring is continued at this temperature for some hours. The liquid is cooled and filtered and the solid matter is washed with nitrobenzene and alcohol and dried. The new condensation product is a dark violet powder, soluble in concentrated sulfuric acid to a red-orange solution and yielding with hydrosulfite and caustic soda solution a violet-brown vat in which cotton is dyed a red-violet of good fastness to light, washing and chlorine. The corresponding dyestuff from 4-amino-4'-chloro-2.1-anthraquinone-acridone shows analogous properties. If the 5-amino-2.1-anthraquinone-acridone be substituted for the 8-derivative there is obtained a dyestuff which produces on cotton very fast brownish bordeaux tints.

Example 2.

24 parts of the condensation product from one molecular proportion of cyanuric chloride and one molecular proportion of 4-amino-2.1-anthraquinone-acridone are mixed with 17 parts of 5-amino-2.1-anthraquinone-acridone and 500 parts of nitrobenzene; the mixture is boiled for a long time in a reflux apparatus. The cooled liquid is then filtered and the solid matter washed with nitrobenzene and alchohol and dried. This new condensation product is a dark powder, soluble in concentrated sulfuric acid to a red-orange solution, and yielding with hydrosulfite and caustic soda solution, a dark red violet vat which dyes cotton fast violet-grey tints.

By boiling 10 parts of this product, which still contains halogen, for some time with aniline the remaining chlorine is exchanged for the aniline-residue with formation of a new condensation product which dissolves in concentrated sulfuric acid to a red-orange solution and yields with hydrosulfite and caustic soda solution a red-violet vat which dyes cotton fast violet.

What I claim is:

1. The herein described process for the manufacture of condensation products of the anthraquinone series by causing nucleal halogen derivatives of the 1.3.5-triazine to react on compounds of the general formula

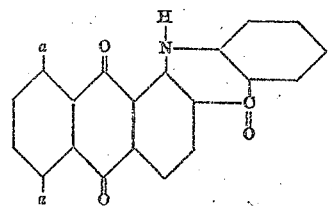

wherein one of the letters $a$ stands for the amino group and the other for a hydrogen atom.

2. The herein described process for the manufacture of condensation products of the anthraquinone series by causing nucleal halogen derivatives of the 1,3.5-triazine to react on compounds of the general formula

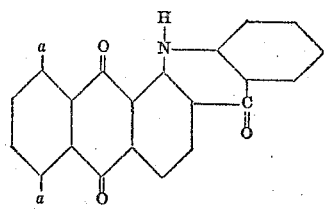

wherein one of the letters $a$ stands for the amino group and the other for a hydrogen atom and condensing the resulting reaction products with further compounds which have reactive hydrogen atoms.

3. The herein described process for the manufacture of condensation products of the anthraquinone series by causing one molecule of cyanuric chloride to react on one molecule of a compound of the general formula

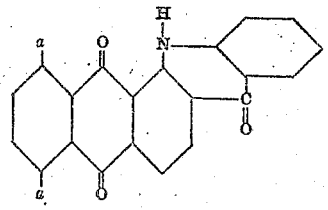

wherein one of the letters $a$ stands for the amino group and the other for a hydrogen atom, and condensing the resulting condensation product with one molecule of the same compound of the above specified general formula.

4. As new products the herein described condensation products of the general formula

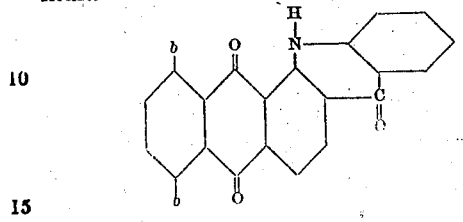

wherein one of the two letters $b$ is a radical

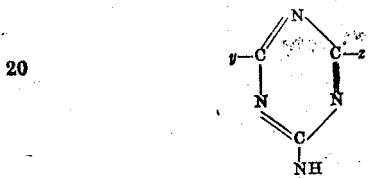

$y$ and $z$ being substituents of which one at least is an amino radical which may be substituted, and wherein the other letter $b$ stands for a hydrogen atom, which products form dark powders, soluble in concentrated sulfuric acid to a red-orange and in alkaline hydrosulfite solution to a violet-brown solution, dyeing cotton tints which vary from red-violet to bordeaux and grey of excellent properties of fastness.

5. As new products the herein described condensation products of the general formula

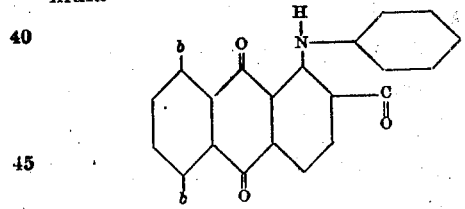

wherein one of the two letters $b$ is a radical

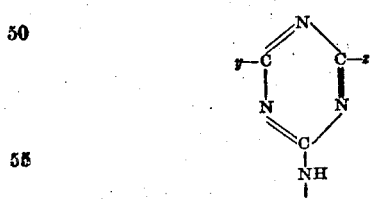

$y$ and $z$ being substituents of which one at least is an arylamino radical which may be substituted, and wherein the other letter $b$ stands for a hydrogen atom, which products form dark powders, soluble in concentrated sulfuric acid to a red-orange and in alkaline hydrosulfite solution to a violet-brown solution, dyeing cotton tints which vary from red-violet to bordeaux and grey of excellent properties of fastness.

6. As new products the herein described condensation products of the general formula

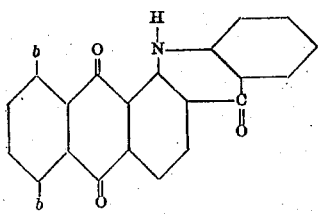

wherein one of the two letters $b$ is a radical

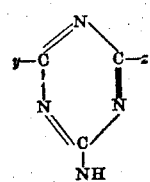

$y$ and $z$ being substituents of which one at least is an arylamino radical which contains an anthraquinone nucleus, and wherein the other letter $b$ stands for a hydrogen atom, which products form dark powders, soluble in concentrated sulfuric acid to a red orange and in alkaline hydrosulfite solution to a violet-brown solution, dyeing cotton tints which vary from red-violet to bordeaux and grey of excellent properties of fastness.

7. As new products the herein described condensation products of the symmetrical general formula

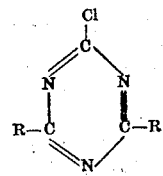

wherein the two R's each mean a compound of the general formula

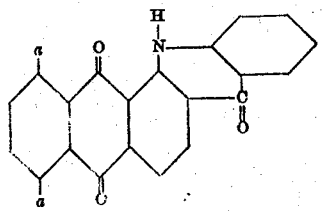

in which one of the letters $a$ stands for a NH-group and the other for a hydrogen atom and in which compound the NH-group is linked to the cyanuric nucleus, which products form dark powders, soluble in concentrated sulfuric acid to a red-orange solution and in an alkaline hydrosulfite solution to a violet-brown solution, dyeing cotton red-violet to brownish bordeaux tints of excellent properties of fastness.

8. Material dyed with the dyestuffs of claim 4.

9. Material dyed with the dyestuffs of claim 5.

10. Material dyed with the dyestuffs of claim 6.

11. Material dyed with the dyestuffs of claim 7.

In witness whereof I have hereunto signed my name this 22nd day of April 1925.

PAUL SCHETELIG.